United States Patent
Yaron et al.

(10) Patent No.: US 8,462,151 B2
(45) Date of Patent: *Jun. 11, 2013

(54) SENDING THREE-DIMENSIONAL IMAGES OVER A NETWORK

(75) Inventors: Ronnie Yaron, Raanana (IL); Ofer Shor, Tel Aviv (IL)

(73) Assignee: Skyline Software Systems, Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/541,173

(22) Filed: Jul. 3, 2012

(65) Prior Publication Data

US 2013/0038604 A1 Feb. 14, 2013

Related U.S. Application Data

(60) Continuation of application No. 12/435,840, filed on May 27, 2009, now Pat. No. 8,237,713, which is a continuation of application No. 11/445,165, filed on Jun. 2, 2006, now Pat. No. 7,551,172, which is a division of application No. 10/330,181, filed on Dec. 30, 2002, now abandoned, which is a continuation-in-part of application No. 09/258,663, filed on Feb. 26, 1999, now Pat. No. 6,496,189, which is a continuation of application No. 09/494,979, filed on Jan. 31, 2000.

(51) Int. Cl.
*G06T 15/00* (2011.01)

(52) U.S. Cl.
USPC ........... 345/419; 345/423; 345/428; 345/581; 345/582

(58) Field of Classification Search
USPC .................. 345/419, 423, 428, 581, 582, 427
See application file for complete search history.

(56) References Cited

U.S. PATENT DOCUMENTS

| | | | |
|---|---|---|---|
| 4,213,252 | A | 7/1980 | Sullivan et al. |
| 4,504,913 | A | 3/1985 | Miura et al. |
| 4,513,377 | A | 4/1985 | Hasebe et al. |
| 4,514,810 | A | 4/1985 | Ito et al. |
| 4,520,506 | A | 5/1985 | Chan et al. |
| 4,527,155 | A | 7/1985 | Yamaki et al. |
| 4,532,514 | A | 7/1985 | Hatano et al. |
| 4,543,572 | A | 9/1985 | Tanaka et al. |
| 4,550,317 | A | 10/1985 | Moriyama et al. |
| 4,615,013 | A | 9/1986 | Yan et al. |
| 4,766,556 | A | 8/1988 | Arakawa |
| 4,821,212 | A | 4/1989 | Heartz |
| 4,855,934 | A | 8/1989 | Robinson |

(Continued)

FOREIGN PATENT DOCUMENTS

DE 195 49 306 A1 7/1997

OTHER PUBLICATIONS

C4:04-cv-11129—Declaration of Geri Haight—Mar. 10, 2006.
C4:04-cv-11129—Exhibit A—Mar. 10, 2006.

(Continued)

*Primary Examiner* — Kimbinh T Nguyen
(74) *Attorney, Agent, or Firm* — Clifford Kraft

(57) ABSTRACT

A benefit is obtained for sending digital information over a network. The digital information is representative of three-dimensional images which include photographic images. The receiving computer renders the images from the received digital information, and a viewer at the receiving computer can interactively choose a viewpoint or perspective to view the images on a display of the receiving computer. The benefit to the sender can be monetary compensation and/or increased recognition of the sender, for example.

20 Claims, 10 Drawing Sheets

U.S. PATENT DOCUMENTS

| | | | |
|---|---|---|---|
| 4,888,713 A | 12/1989 | Falk | |
| 4,931,954 A | 6/1990 | Honda et al. | |
| 4,935,879 A | 6/1990 | Ueda | |
| 4,974,176 A | 11/1990 | Buchner et al. | |
| 4,994,989 A | 2/1991 | Usami et al. | |
| 5,051,929 A | 9/1991 | Tutt et al. | |
| 5,128,870 A | 7/1992 | Erdman et al. | |
| 5,153,936 A | 10/1992 | Morris et al. | |
| 5,261,041 A | 11/1993 | Susman | |
| 5,265,176 A | 11/1993 | Miller | |
| 5,325,472 A | 6/1994 | Horiuchi et al. | |
| 5,327,509 A | 7/1994 | Rich | |
| 5,394,516 A | 2/1995 | Winser | |
| 5,420,969 A | 5/1995 | Lie et al. | |
| 5,428,715 A | 6/1995 | Suzuki | |
| 5,434,966 A | 7/1995 | Nakazawa et al. | |
| 5,467,444 A | 11/1995 | Kawamura et al. | |
| 5,471,563 A | 11/1995 | Dennis et al. | |
| 5,499,194 A | 3/1996 | Prestidge et al. | |
| 5,502,798 A | 3/1996 | Ito et al. | |
| 5,515,482 A | 5/1996 | Yamamoto et al. | |
| 5,550,960 A | 8/1996 | Shirman et al. | |
| 5,561,746 A | 10/1996 | Murata et al. | |
| 5,577,174 A | 11/1996 | Moriwake | |
| 5,586,233 A | 12/1996 | Mio et al. | |
| 5,586,246 A | 12/1996 | Nobori et al. | |
| 5,594,846 A | 1/1997 | Donovan | |
| 5,636,334 A | 6/1997 | Hidaka | |
| 5,657,432 A | 8/1997 | Matsui | |
| 5,675,720 A | 10/1997 | Sato et al. | |
| 5,680,474 A | 10/1997 | Iijima et al. | |
| 5,687,307 A | 11/1997 | Akisada et al. | |
| 5,694,530 A | 12/1997 | Goto | |
| 5,701,403 A | 12/1997 | Watanabe et al. | |
| 5,726,689 A | 3/1998 | Negishi et al. | |
| 5,745,665 A | 4/1998 | Pasco et al. | |
| 5,760,783 A | 6/1998 | Migdal et al. | |
| 5,764,233 A | 6/1998 | Brinsmead et al. | |
| 5,774,132 A | 6/1998 | Uchiyama | |
| 5,782,762 A | 7/1998 | Vining | |
| 5,784,301 A | 7/1998 | Guo et al. | |
| 5,828,382 A | 10/1998 | Wilde | |
| 5,831,875 A | 11/1998 | Hirata et al. | |
| 5,847,712 A | 12/1998 | Salesin et al. | |
| 5,847,717 A | 12/1998 | Berry | |
| 5,850,226 A | 12/1998 | Nagasawa et al. | |
| 5,856,829 A | 1/1999 | Gray, III et al. | |
| 5,860,077 A | 1/1999 | Kim et al. | |
| 5,864,640 A | 1/1999 | Miramonti et al. | |
| 5,867,166 A | 2/1999 | Myhrvold et al. | |
| 5,870,105 A | 2/1999 | Jensen | |
| 5,870,307 A | 2/1999 | Hull et al. | |
| 6,100,897 A | 8/2000 | Mayer et al. | |
| 6,362,817 B1 | 3/2002 | Powers et al. | 345/419 |
| 6,538,652 B2 | 3/2003 | Kato | 345/423 |
| 6,587,109 B1 | 7/2003 | Rose et al. | 345/473 |
| 6,640,145 B2 | 10/2003 | Hoffberg et al. | 700/83 |

OTHER PUBLICATIONS

C4:04-cv-11129—Exhibit B—Mar. 10, 2006.
C4:04-cv-11129—Exhibit C—Mar. 10, 2006.
C4:04-cv-11129—Exhibit D—Mar. 10, 2006.
C4:04-cv-11129—Defendants opening claim construction brief—Sep. 29, 2006.
C4:04-cv-11129—Declaration of Carolyn Chang—Sep. 29, 2006.
C4:04-cv-11129—Exhibit A—Sep. 29, 2006.
C4:04-cv-11129—Exhibit B—Sep. 29, 2006.
C4:04-cv-11129—Exhibit C—Sep. 29, 2006.
C4:04-cv-11129—Exhibit D—Sep. 29, 2009.
C4:04-cv-11129—Exhibit E—Sep. 29, 2006.
C4:04-cv-11129—Exhibit F—Sep. 29, 2006.
C4:04-cv-11129—Exhibit G—Sep. 29, 2006.
C4:04-cv-11129—Exhibit H—Sep. 29, 2006.
C4:04-cv-11129—Exhibit I—Sep. 29, 2006.
C4:04-cv-11129—Exhibit J—Sep. 29, 20067.
C4:04-cv-11129—Exhibit K—Sep. 29, 2006.
C4:04-cv-11129—Exhibit L—Sep. 29, 2006.
C4:04-cv-11129—Declaration of Stephen Feiner—Sep. 29, 2006.
C4:04-cv-11129—Plaintiff's Opening claim construction brief—Sep. 29, 2006.
C4:04-cv-11129—Declaration of Geri Haight—Sep. 29, 2006.
C4:04-cv-11129—Exhibit D—Sep. 29, 2006.
C4:04-cv-11129—Declaration of Dinesh Manocha—Sep. 29, 2006.
C4:04-cv-11129—Defendant's claim construction brief—Oct. 11, 2006.
C4:04-cv-11129—Declaration of Carolyn Chang—Oct. 11, 2006.
C4:04-cv-11129—Exhibit M—Oct. 11, 2006.
C4:04-cv-11129—Supp declaration of Stephen Feinger—Oct. 11, 2006.
C4:04-cv-11129—Plaintiff's claim construction brief—Oct. 11, 2006.
C4:04-cv-11129—Declaration of Dinesh Manocha—Oct. 11, 2006.
C4:04-cv-11129—Declaration of Joseph Haight—Oct. 11, 2006.
C4:04-cv-11129—Exhibit A—Oct. 11, 2006.
C4:04-cv-11129—Exhibit B—Oct. 11, 2006.
C4:04-cv-11129—Exhibit C—Oct. 11, 2006.
C4:04-cv-11129—Order of reconsolidation—Nov. 27, 2006.
Rendering algorithms , Agranov , prior to 2006.
Global Terrain Texture—Cosman—Oct. 29, 2004.
C4:04-cv-11129—Declaration of Joseph Hameline—Jan. 4, 2006.
C4:04-cv-11129—Declaration of Terry Keating—Jan. 4, 2006.
C4:04-cv-11129—Declaration of Ahron Yaron—Jan. 4, 2006.
C4:04-cv-11129—Defendant's memorandum in opposition of preliminary injunction—Feb. 3, 2006.
C4:04-cv-11129—Markman Order—Mar. 24, 2006.
C4:04-cv-11129—Memo in support of preliminary injunction—Jan. 4, 2006.
Google1 litigation involving parent patent US 6,496,189—Complaint filed Nov. 18, 2004 by Skyline Inc. against Google C4:04-cv-00942 PJH.
C4:04-cv-00942 PJH—Order setting trial management Dec. 2004.
C4:04-cv-00942 PJH—AO120 Report to Commissioner for Patents regarding litigation—Nov. 19, 2004.
C4:04-cv-00942 PJH—Summons—Nov. 23, 2004.
C4:04-cv-00942 PJH—Certification of interested parties—Dec. 7, 2004.
C4:04-cv-00942 PJH—Declination to proceed before magistrate judge—Dec. 7, 2004.
C4:04-cv-00942 PJH—Notice of impending reassignment to a district judge—Dec. 9, 2004.
C4:04-cv-00942 PJH—Reassignment order—Dec. 10, 2004.
C4:04-cv-00942 PJH—Defendant's motion to dismiss or stay—Dec. 13, 2004.
C4:04-cv-00942 PJH—Declaration of Aharon Yaron supporting defendant's motion—Dec. 9, 2004.
C4:04-cv-00942 PJH—Defendant Keyhole's Answer and Counterclaim—Dec. 13, 2004.
C4:04-cv-00942 PJH—Plaintiff's motion for leave to amend complaint—Dec. 6, 2004.
C4:04-cv-00942 PJH—Google web page—Oct. 28, 2004.
C4:04-cv-00942 PJH—Letter from Joseph Hameline—Nov. 16, 2004.
C4:04-cv-00942 PJH—Earlier Complaint against Keyhole filed May 28, 2004 C4:04-cv-11129 DPW.
C4:04-cv-00942 PJH—Google article—Oct. 28, 2004.
C4:04-cv-00942 PJH—Declaration of Joseph Hameline—Dec. 2004.
C4:04-cv-00942 PJH—Proposed order granting Skyline's motion to dismiss—Dec. 2004.
C4:04-cv-00942 PJH—Notice and order setting hearing—Dec. 13, 2004.
C4:04-cv-00942 PJH—Notice of Voluntary dismissal—Dec. 27, 2004.
C4:04-cv-00942 PJH—Stipulated order of voluntary dismissal—Jan. 3, 2005.
C4:04-cv-4922—Google complaint for declaratory judgment—various documents for declaratory judgment case—May 2004 to Nov. 2004.

C4:04-cv-11129—Exhibit 4—Jan. 4, 2006.
C4:04-cv-11129—Exhibit 5—Jan. 4, 2006.
C4:04-cv-11129—Exhibit 6—Jan. 4, 2006.
C4:04-cv-11129—Exhibit 7—Jan. 4, 2006.
C4:04-cv-11129—Exhibit 8—Jan. 4, 2006.
C4:04-cv-11129—Exhibit 9—Jan. 4, 2006.
C4:04-cv-11129—Exhibit 11—Jan. 4, 2006.
C4:04-cv-11129—Exhibit 12—Jan. 4, 2006.
C4:04-cv-11129—Exhibit 13 Using Keyhole—Jan. 4, 2006.
C4:04-cv-11129—Exhibit 13 cont—Jan. 4, 2006.
C4:04-cv-11129—Exhibit 14—Jan. 4, 2006.
C4:04-cv-11129—Exhibit 15—Jan. 4, 2006.
C4:04-cv-11129—Exhibit 16—Jan. 4, 2006.
C4:04-cv-11129—Exhibit 17—Jan. 4, 2006.
C4:04-cv-11129—Exhibit 18—Jan. 4, 2006.
C4:04-cv-11129—Exhibit 19—Jan. 4, 2006.
C4:04-cv-11129—Exhibit 20—Jan. 4, 2006.
C4:04-cv-11129—Exhibit 21—Jan. 4, 2006.
C4:04-cv-11129—Exhibit 22—Jan. 4, 2006.
C4:04-cv-11129—Exhibit A—Jan. 4, 2006.
C4:04-cv-11129—Declaration of Aharon Yaron—Jan. 4, 2006.
C4:04-cv-11129—Motion to Impound—Feb. 6, 2006.
C4:04-cv-11129—Declaration of Michael Jones supporting motion to impound—Feb. 6, 2006.
C4:04-cv-11129—Declaration of Sandra Riley supporting motion to impound—Feb. 6, 2006.
C4:04-cv-11129—Points and Authorities in opposition of motion for preliminary injunction—Feb. 3, 2006.
C4:04-cv-11129—Points and Authorities in opposition of motion for preliminary injunction—Feb. 3, 20067.
C4:04-cv-11129—Declaration of Micheal Jones—Feb. 3, 2006.
C4:04-cv-11129—Redacted declaration of Michael Jones—Feb. 3, 2006.
C4:04-cv-11129—Declaration of Stephen Feiner—Feb. 3, 2006.
C4:04-cv-11129—Exhibit A—Feb. 3, 2006.
C4:04-cv-11129—Exhibit B—Feb. 3, 2006—Technical note 540 1995.
C4:04-cv-11129—Exhibit C—Feb. 3, 2006—Rendering algorithms 1995.
C4:04-cv-11129—Declaration of Sandra Riley in opposition to preliminary injunction—Feb. 3, 2006.
C4:04-cv-11129—Exhibit B—Feb. 3, 2006.
C4:04-cv-11129—Exhibit D—Feb. 3, 2006—NASA Webpage Feb. 2, 2006.
C4:04-cv-11129—Exhibit E—Feb. 3, 2006—Digital Globe webpage Feb. 2, 2006.
C4:04-cv-11129—Exhibit F—Feb. 3, 2006.
C4:04-cv-11129—Exhibit G—Feb. 3, 2006.
C4:04-cv-11129—Exhibit H—Feb. 3, 2006.
C4:04-cv-11129—Exhibit I—Feb. 3, 2006.
C4:04-cv-11129—Exhibit J—Feb. 3, 2006—Global Terrain Pattern Oct. 29, 2004.
C4:04-cv-11129—Exhibit C—Feb. 3, 2006.
C4:04-cv-11129—Declaration of Aharon Yaron—Mar. 10, 2006.
C4:04-cv-11129—Motion for preliminary injunction—Jan. 4, 2006.
C4:04-cv-11129—plaintiff's supp responses to interrogatories—Sep. 22, 2006.
Distributed parallel data storage systems—Tierney et al—Before 2006.
C4:04-cv-11129—Memorandum and order—Mar. 24, 2006.
C4:04-cv-4922—Complaint for declaratory judgment—Dec. 13, 2004.
C4:04-cv-4922—Motion to dismiss—Dec. 13, 2004.
C4:04-cv-4922—Declaration of Aharon Yaron—Dec. 9, 2004.
C4:04-cv-4922—Declaration of Joseph Hameline—May 28, 2004.
C4:04-cv 10980—Memorandum and order—2006.
C4:04-cv 10980—Motion for summary judgment—Jan. 19, 2007.
C4:04-cv 10980—Memorandum in support of motion for summary judgment—Jan. 19, 2007.
C4:04-cv 10980—Defendant's motion for summary judgment based on public use—Jan. 19, 2007.
C4:04-cv 10980—Points and authorities for summary judgment based on public use—Jan. 19, 2007.
C4:04-cv 10980—Declaration of Steven Feiner—Jan. 19, 2007.
C4:04-cv 10980—Declaration of Carolyn Chang—Jan. 19, 2007.
C4:04-cv 10980—Statement of material facts—Jan. 19, 2007.
C4:04-cv 10980—Points and authorities—Jan. 19, 2007.
C4:04-cv 10980—Plaintiff's motion for summary judgment—Jan. 19, 2007.
C4:04-cv 10980—Plaintiff's motion for summary judgment on infringement—Jan. 19, 2007.
C6:06-cv-10980 DPW *Complaint Skyline* v. *Google*—Jun. 5, 2006.
C6:06-cv-10980 DPW—Answer and counterclaims—Jul. 27, 2006.
C6:06-cv-10980 DPW—Amended complaint—Nov. 9, 2006.
C6:06-cv-10980 DPW—Answer and counterclaims—Nov. 22, 2006.
C6:06-cv-10980 DPW—Defendant's statement of undisputed material facts—Jan. 19, 2007.
C6:06-cv-10980 DPW—Claim construction Memorandum and Order—Nov. 16, 2006.
C6:06-cv-10980 DPW—Memorandum in support of motion for summary judgment for non-infringement—Jan. 19, 2007.
C6:06-cv-10980 DPW—Declaration of Professor Feiner and technical report—Jan. 19, 2007.
C6:06-cv-10980 DPW—Declaration of Carolyn Chang—Jan. 19, 2007.
C6:06-cv-10980 DPW—Memorandum in support of motion for summary judgment of anticipation—Jan. 19, 2007.
C6:06-cv-10980 DPW—Plaintiff Skyline's motion for summary judgment—Jan. 19, 2007.
C6:06-cv-10980 DPW—Defendant's opposition to plaintiff's motion for summary judgment—Feb. 2, 2007.
C6-06-cv-10980 DPW—Separate statement of material facts in support of opposition to plaintiff's motion for summary judgment—Feb. 2, 2007.
C6:06-cv-10980 DPW—Declaration of Feiner in support of opposition—Feb. 2, 2007.
C6:06-cv-10980 DPW—Declaration of Mewes in support of opposition—Feb. 2, 2007.
C6:06-cv-10980 DPW—Statement of facts in opposition—Feb. 2, 2007.
C6:06-cv-10980 DPW—Memorandum of points and authorities in opposition—Feb. 2, 2007.
C6:06-cv-10980 DPW—Declaration of Haight—Feb. 9, 2007.
C6:06-cv-10980 DPW—Reply in support of defendant's motion for summary judgment non-infringement—Feb. 9, 2007.
C6:06-cv-10980 DPW—Reply brief in support of defendant's motion for anticipation based on public use—Feb. 9, 2007.
C6:06-cv-10980 DPW—Plaintiff's reply memorandum in support of it's motion for summary judgment—Feb. 9, 2007.
C6:06-cv-10980 DPW—Judgment against Plaintiff—Apr. 11, 2007.
C6:06-cv-10980 DPW—Defendant's amended initial disclosures—Sep. 19, 2006.
C6:06-cv-10980 DPW—Defendant's motion for summary judgment for anticipation based on public use—Jan. 19, 2007.
C6:06-cv-10980 DPW—Defendant's motion for summary judgment of non-infringement—Jan. 19, 2007.
C6:06-cv-10980 DPW—Defendant's second amended initial disclosures—Sep. 22, 2006.
C6:06-cv-10980 DPW—Feiner declaration—Feb. 2, 2007.
C6:06-cv-10980 DPW—Feiner expert report—Dec. 8, 2006.
C6:06-cv-10980 DPW—Feiner expert report—Jul. 10, 2006.
C6:06-cv-10980 DPW—Feiner supplamental expert report—Jul. 29, 2006.
Customized Network Planning—2006-2007.
Google Tailors Earth—Jan. 24, 2007.
C6:06-cv-10980 DPW—Height declaration—Jan. 19, 2007.
Magic Final Report—May 1996.
Magic project IEEE report—May 29, 1996.
Magic project—May/Jun. 1996.
C6:06-cv-10980 DPW—Markman Order—Nov. 16, 2006.
C6:06-cv-10980 DPW—Memorandum against Plaintiffs motion for summary judgment on validity—Feb. 2, 2007.
C6:06-cv-10980 DPW—Memorandum and Order—Mar. 7, 2007.
C6:06-cv-10980 DPW—Opposition to Defendant's motion for summary judgment on validity—Feb. 2, 2007.

C6:06-cv-10980 DPW—Opposition to plaintiff's motion for summary judgment on infringement—Feb. 2, 2007.
C6:06-cv-10980 DPW—Reply in support of defendant's motion for summary judgment on non-infringement—Feb. 12, 2007.
C6:06-cv-10980 DPW—Stipulation of issues of fact re plaintiffs motion for summary judgment—Feb. 2, 2007.
C6:06-cv-10980 DPW—Statement of issues of facts re defendant's motion for summary judgment—Feb. 2, 2007.
C6:06-cv10980 DPW—Skyline's plaintiff's motion for summary judgment on validity—Jan. 19, 2007.
TerraVision a terrain visualization system—Apr. 22, 1994.
The design and analysis of spatial data structures—Samet 1989.
C6:06-cv-10980 DPW—Lau deposition exhibits 90-94, 97, 99, 200—Jun. 2006.
C4:04-cv-11129—*Complaint Skyline* v. *Keyhole*—May 28, 2004.
C4-:04-cv-11129—Plaintiff's answers to 1st set of interrogatories—Jan. 2005.
C4:04-cv-11129—Answer and counterclaim—Nov. 2, 2004.
C4:04-cv-11129—Answer to counterclaims—Nov. 22, 2004.
C4:04-cv-11129—Motion to amend complaint—Dec. 6, 2004.
C4:04-cv-11129—Amended complaint—Dec. 6, 2004.
C4:04-cv-11129—Motion to oppose amended complaint—Dec. 16, 2004.
C4:04-cv-11129—Reply brief in support of motion—Dec. 17, 2004.
C4:04-cv-11129—Brief in support of motion to amend—Dec. 17, 2004.
C4:04-cv-11129—Answer and counterclaim to amended complaint—Jan. 24, 21005s.
C4:04-cv-11129—Reply to counterclaim—Jan. 27, 2005.
C4:04-cv-11129—Plaintiff opening claim construction brief—Mar. 4, 2005.
C4:04-cv-11129—Declaration of Joseph Hameline—Mar. 4, 2005.
C4:04-cv-11129—Exhibit A—Mar. 4, 2005.
C4:04-cv-11129—Exhibit B—Mar. 4, 2005.
C4:04-cv-11129—Exhibit C—Mar. 4, 2005.
C4:04-cv-11129—Exhibit D—Mar. 4, 2005.
C4:04-cv-11129—Exhibit E—Mar. 4, 2005.
C4:04-cv-11129—Exhibit F—Mar. 4, 2005.
C4:04-cv-11129—Plaintiff's answers to interrogatory No. 2—Mar. 3, 2005.
C4:04-cv-11129—Notice of filing—Mar. 4, 2005.
C4:04-cv-11129—Exhibit G—Mar. 4, 2005.
C4:04-cv-11129 —AIPL Interpretation of patent claims—Mar. 4, 2005.
C4:04-cv-11129—Defendant's claim construction brief—Mar. 25, 2005.
C4:04-cv-11129—Defendant's proposed claim construction order—Mar. 25, 2005.
C4:04-cv-11129—Exhibit A—Mar. 25, 2005.
C4:04-cv-11129—Feiner Exhibit A—Mar. 15, 2005.
C4:04-cv-11129—Feiner Exhibit B—Mar. 25, 2005.
C4:04-cv-11129—Declaration of Stephen Feiner—Mar. 25, 2005.
C4:04-cv-11129—Exhibit 1—Mar. 25, 2005.
C4:04-cv-11129—Exhibit 2—Mar. 25, 2005.
C4:04-cv-11129—Exhibit 3—Mar. 25, 2005.
C4:04-cv-11129—Exhibit 5—Mar. 25, 2005.
C4:04-cv-11129—Exhibit 6—Mar. 25, 2005.
C4:04-cv-11129—Exhibit 7—Mar. 25, 2005.
C4:04-cv-11129—Exhibit 8—Mar. 25, 2005.
C4:04-cv-11129—Exhibit 9—Mar. 25, 2005.
C4:04-cv-11129—Exhibit 11—Mar. 25, 2005.
C4:04-cv-11129—Declaration of Darryl Woo—Mar. 25, 2005.
C4:04-cv-11129—Excerpts from Microsoft computer dictionary—Mar. 25, 2005.
C4:04-cv-11129—Excerpts from Webster's dictionary—Mar. 25, 2005.
C4:04-cv-11129—Declaration of Joseph Hameline—Apr. 8, 2005.
C4:04-cv-11129—Exhibit 1—Jan. 4, 2006.
C4:04-cv-11129—Exhibit 2—Jan. 4, 2006.
C4:04-cv-11129—Exhibit 3—Jan. 4, 2006.
Seth Teller "Automatic Acquisition of Hierarchical, Textured 3D Geometric Models of Urban Environments: Project Plan". Published 1997.
Parent U.S. Appl. No. 12/435,840, U.S. Appl. No. 11/445,165, U.S. Appl. No. 10/330,181, U.S. Appl. No. 09/258,663 and U.S. Appl. No. 09/494,979 including all art cited or supplied in these cases under 37 C.F.R. s. 1.98(d).
Parent reexamination 90/009,872.
All documents cited in this IDS were supplied in parent case U.S. Appl. No. 12/435,840 and reexamination 90/009,872.
TerraVision, a Terrain Visualization System, Technical Note 540, Apr. 22, 1994.
Magic Final Report, DARPA 1996.
"Hierarchical Geometric Models for Visible Surface Algorithms" James H. Clark, Comm. ACM Oct. 1976.
"Multiresolution Modeling for Fast Rendering", Paul S. Heckbert et al., Proc. of Graphics Interface '94, May 1994.

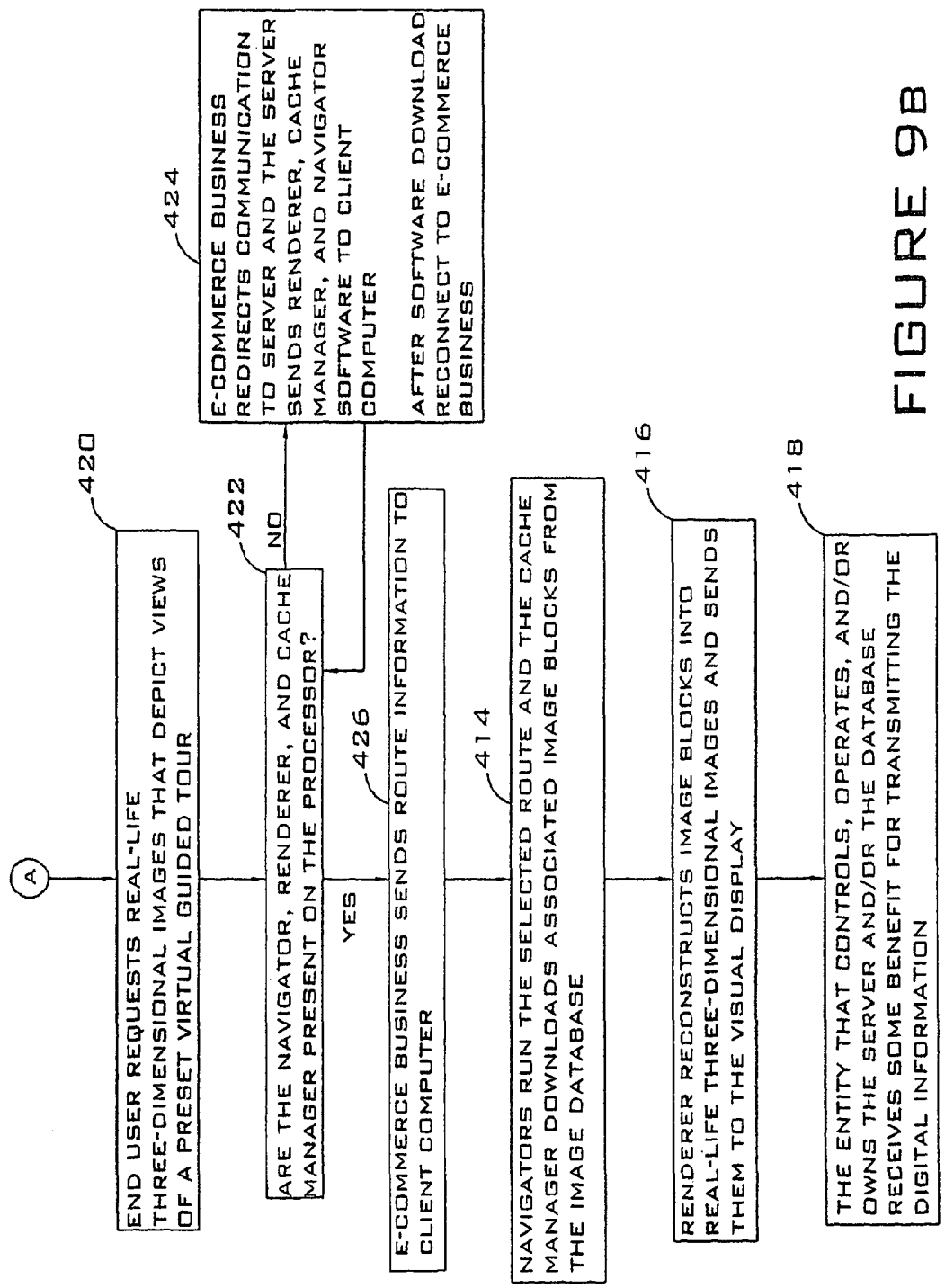

SENDING THREE-DIMENSIONAL IMAGES OVER A NETWORK

CROSS REFERENCE TO RELATED CASE

This is a continuation and claims priority to and benefit of U.S. patent application Ser. No. 12/435,840 filed May 27, 2009 which claims priority to and benefit of U.S. patent application Ser. No. 11/445,165, filed Jun. 2, 2006, which is a divisional and claims priority to and benefit of U.S. patent application Ser. No. 10/330,181, filed Dec. 30, 2002, now abandoned, which is a continuation-in-part and claims priority to and the benefit of U.S. patent application Ser. No. 09/258,663, filed Feb. 26, 1999, now U.S. Pat. No. 6,496,189, and is a continuation of and claims the benefit of U.S. patent application Ser. No. 09/494,979, filed Jan. 31, 2000, now abandoned applications Ser. Nos. 12/435,840, 11/455,165, 10/330,181, 09/258,663 and 09/494,979 are hereby incorporated by reference.

TECHNICAL FIELD

The present invention relates generally to obtaining a benefit for sending digital information over a communication network.

BACKGROUND INFORMATION

U.S. Pat. No. 4,940,972, describes displaying to a pilot of an aircraft a synthetic image of the ground terrain over which the pilot is flying. U.S. Pat. No. 5,566,073 describes allowing a pilot to preview a route either in flight or on the ground. The '073 patent also describes allowing the pilot to take over and try out different flight strategies. The data volume required to display flight routes in accordance with the above-mentioned patents is very large. The '073 patent describes representing the terrain as polygons in order to save computer storage space, but even so, the amount of storage on most home computers allows only a limited area and/or resolution level to be displayed. The '073 patent describes using a CD-ROM to store the required data, but the delivery of the CD-ROM to home users requires time and changes in the terrain (such as seasonal changes) can require frequent updates of the data on the CD-ROM.

SUMMARY OF THE INVENTION

It is an object of some aspects of the present invention to provide methods and apparatus for displaying on a remote computer actual images of an area as seen from a viewpoint which is chosen interactively.

It is still another object of some aspects of the present invention to provide methods and apparatus for displaying on a client computer three-dimensional images stored in a remote server, which are conveyed to the client via a network, preferably the Internet.

It is still another object of some aspects of the present invention to provide methods and apparatus for streaming data required for rendering three-dimensional images on a remote computer.

In some embodiments of the present invention, a processor simulates traveling along a selected route. At substantially any viewpoint along the route, the processor displays the view seen from the viewpoint in three-dimensional real-life images. A user may select at substantially each point along the route the direction of view and may change the direction dynamically. Preferably, the user controls the speed of progress along the route and may stop the progress and/or reverse direction along the course.

Preferably, the user views the three-dimensional images without having to store a large database of images on the user's processor, and without requiring that the processor have an unusually large memory capacity. Rather, the user connects to a server, which stores all the required data, and the user's processor downloads the data dynamically according to the data required to display each specific scene. Preferably, the processor connects to the server via a communication link, such as the Internet. Preferably, the data is conveyed by a standard modem at sufficient speed for relatively smooth display of the images.

Alternatively or additionally, the required data is downloaded prior to the displaying of the scene, or the data is retrieved from a CD or other memory or storage apparatus associated with the processor.

U.S. patent application Ser. No. 08/939,948, which is assigned to the assignee of the present application and is incorporated herein by reference, describes a method of rendering three-dimensional terrain images. The method allows fast rendering of images by comparison with other methods known in the art. The method of U.S. patent application Ser. No. 08/939,948 uses a hierarchical database in which substantially each image is described in a plurality of blocks at different resolution levels. The blocks at lower resolution levels include less detail per unit area, to while the blocks of higher resolution levels include more detail per unit area. The additional storage space required in order to store the additional data required due to the hierarchical structure is "paid back" in improved time performance of the rendering.

There is further provided in accordance with an embodiment of the present invention, a method of displaying three dimensional images, including establishing a communication link between a local processor and a server, transferring data blocks describing three-dimensional images over the communication link from the server to the local processor; and rendering a three-dimensional image at the local processor responsive to the data blocks.

There is further provided in accordance with an embodiment of the present invention, an apparatus for displaying three dimensional images, including a processor, a communication link between the processor and a server over which data blocks describing terrain are transferred, and a display on which the processor renders three-dimensional terrain images responsive to the data blocks.

In general, the invention relates to obtaining a benefit for sending digital information over a network. The digital information is representative of three-dimensional images which include photographic images. The receiving computer renders the images from the received digital information, and a viewer at the receiving computer can interactively choose a viewpoint or perspective to view the images on a display of the receiving computer. The benefit to the sender can be monetary compensation DT increased recognition of the sender, for example.

In one aspect, the invention relates to a method of obtaining a benefit for sending digital information over a communication network. The steps of this method comprise: (A) providing at least one first database that includes digital information representative of three-dimensional images including photographic images, (B) receiving requests over the communication network for at least some of the digital information in the database, (C) sending the requested digital information over the communication network, and (D) receiving a benefit for sending the requested digital information.

In one embodiment, step (C) further comprises providing the digital information which is associated with at least one of a plurality of travel courses stored in a second database.

In some embodiments, the benefit includes monetary compensation (possibly derived from advertising) and/or increased recognition of an entity that performs steps (A), (B), and/or (C).

In some embodiments, the method further comprises providing at least one second database that includes digital information representative of a plurality of travel courses and each travel course is associated with at least some of the digital information stored in the first databases.

In one embodiment, step (C) further includes sending software to convert the requested digital information into the images.

In another aspect, the invention features a system for providing three-dimensional images. The system comprises at least one first database comprising digital information representing three-dimensional images including photographic images, an input module configured to receive requests over a communication network for at least some of the digital information in the first database, and an output module configured to send the requested digital information over the communication network. A benefit is received for using the system to send the requested digital information over the communication network using the system.

The system can further comprise at least one second database that includes digital information representative of a plurality of travel courses where each travel course is associated with at least some of the digital information stored in the first database. The output module can be configured to send software to convert the requested digital information into the three-dimensional images. The digital information included in the first database can be associated with is at least one of a plurality of travel courses stored in a second database. The input module can comprise a software program running on a computer server, and the output module can comprise a software program running on a computer server.

In still another aspect, the invention relates to a system for sending digital information over a communication network. The system comprises a first database including digital information representative of three-dimensional images including photographs. The system also comprises a computer server in communication with the first and with the communication network and a client computer for allowing an end user to send requests over the communication network for at least some of the three-dimensional images and for allowing the end user to receive the digital information representing the requested three-dimensional images. The system also comprises an e-commerce business for receiving the end user's requests over the communication network and redirecting the end users requests to the computer server so the computer server can send the digital information representing the requested three-dimensional images to the end user's client computer. The computer server comprises an input module configured to receive requests over the communication network for at least some of the digital information in the first database, and an output module configured to send the requested digital information over the communication network. An operator of the system receives a benefit for sending the requested digital information.

In all aspects and embodiments of the invention the benefit that is received for sending the requested digital information can include monetary compensation and/or increased recognition of the operator or other entity involved with sending the requested digital information over the communication network.

The present invention will be more fully understood from the following detailed description, including

BRIEF DESCRIPTION OF THE DRAWINGS

FIGS. 9*a* and 9*b* are flow diagrams illustrating obtaining a benefit for sending digital information over a communication network, in accordance with the present invention.

DESCRIPTION

Figure 1:
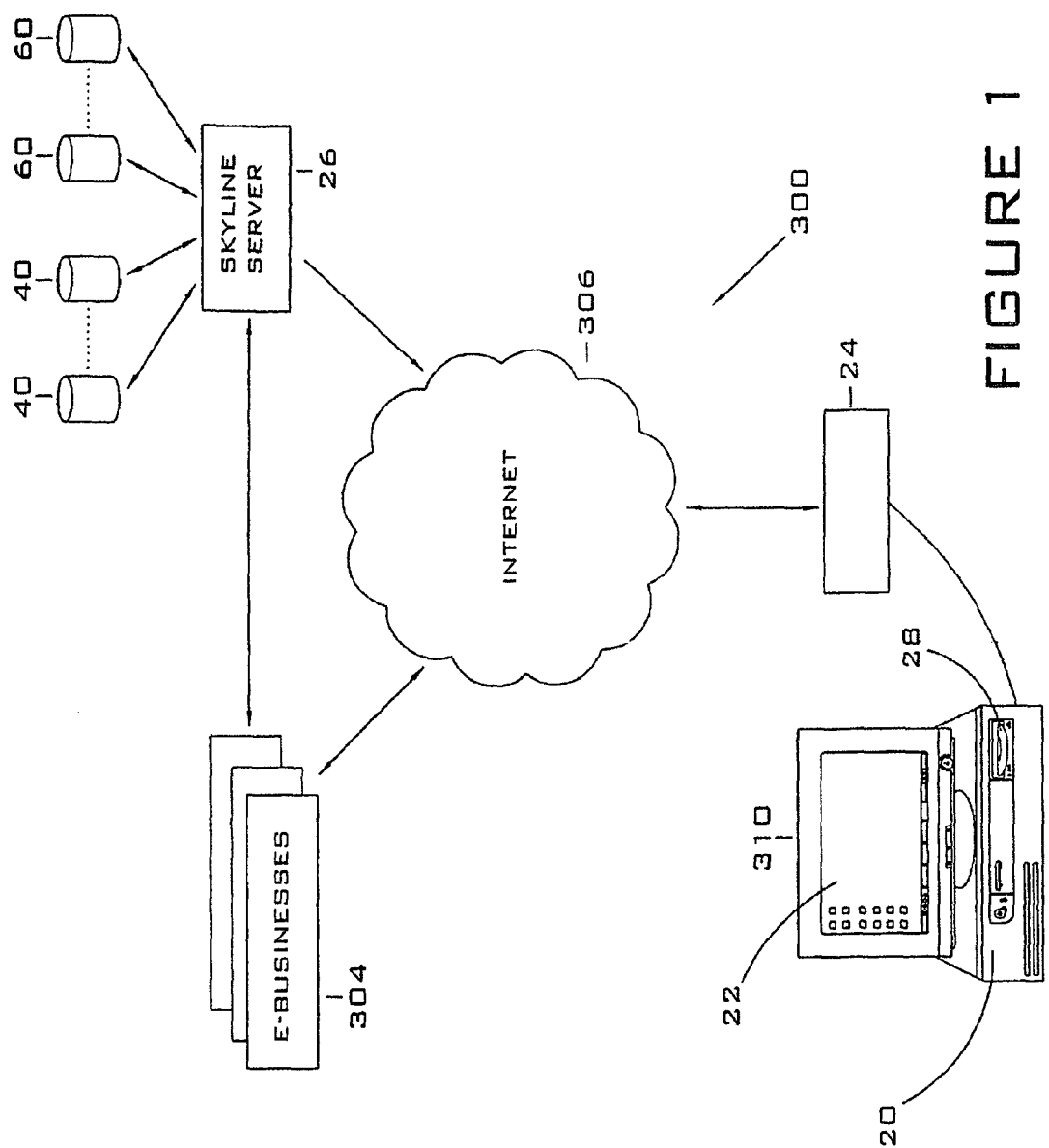
FIG. 1 is a schematic illustration of a system for obtaining compensation for sending information over a communication network in accordance with the present invention.

FIG. 1 is a schematic illustration of a system 300 for obtaining compensation for sending information over a communication network in accordance with the present invention. In FIG. 1, the disclosed embodiment of the system 300 includes one or more computer servers 26 (one server 26 is shown), a communication network 306 such as the Internet or other computer network at least one image database 40, at least one course database 60, at least one third-party electronic-commerce business or entity (e-commerce business) 304, and at least one client computer 310. Each client computer 310 typically will include at least a processor 20, a visual display 22, and a communication network interface 24. The e-commerce business 304 includes one or more server computers for communication with the server(s) 26 and the client computer(s) 310, generally via the network 306. The network 306 can include a variety of different and/or similar links including wireless links.

Digital information representing real-life three-dimensional images is stored in at least one of the image databases 40, and digital information representing a travel course or route is stored in at least one of the course databases 60. Real-life three-dimensional images are created by taking two-dimensional photographic images and, through the use of the rendering method described in U.S. patent application Ser. No. 08/939,948 or other software and/or rendering schemes/devices, rendering three-dimensional images such that the images include the photographic images. The computer server 26 is in communication with the image database (s) 40, the course database(s) 60, and the communication network 306. The client computer 310 is also in communication with the communication network 306 via the communication network interface 24. In one embodiment, the communication network interface 24 is a standard 33,600 kilobyte per second modem. Other modems, faster or slower, may also be used. Additionally, other connections may be used for the communication interface 24, such as ISDN connections or direct routers.

An end user uses the client computer 310 to request real-life three-dimensional images which depict views of a user defined virtual travel course or which depict views of preset guided tour. The request is made by contacting an e-commerce business 304 that is in communication with the communication network 306. The e-commerce business 304 redirects the end user's request to the computer server 26, typically in a way that is transparent to the end user. In response to the end user's request, the computer server 26 retrieves the digital information representing the requested real-life three-dimensional images from the image database 40 that depict views of the user defined virtual travel course or which depict views of a preset guided tour. The computer server 26 transmits the requested digital information to the computer client 310 via the communication network 306. The processor 20 in the computer client 310 receives the requested digital information and reconstructs the real-life three-dimensional images and displays them on the visual display 22.

Alternatively or additionally, the processor 20 communicates with the computer server 26 through a direct communication line. Further alternatively or additionally, the processor 20 receives a storage disk 28, such as a CD, from those who supply the real-life three-dimensional images or from any other distribution source.

The e-commerce business 304 is also in communication with the computer server 26, either directly or via the communication network 306. In response to the computer server 26 transmitting the user requested digital information to the end user, the entity that controls, operates, and/or owns the computer server 26 and/or the data in the databases 40, 60 receives some benefit. The benefit may include, but is not limited to, monetary compensation, and/or increased recognition of the entity by the public or some group (including increased traffic to the entity's website).

Figure 2:
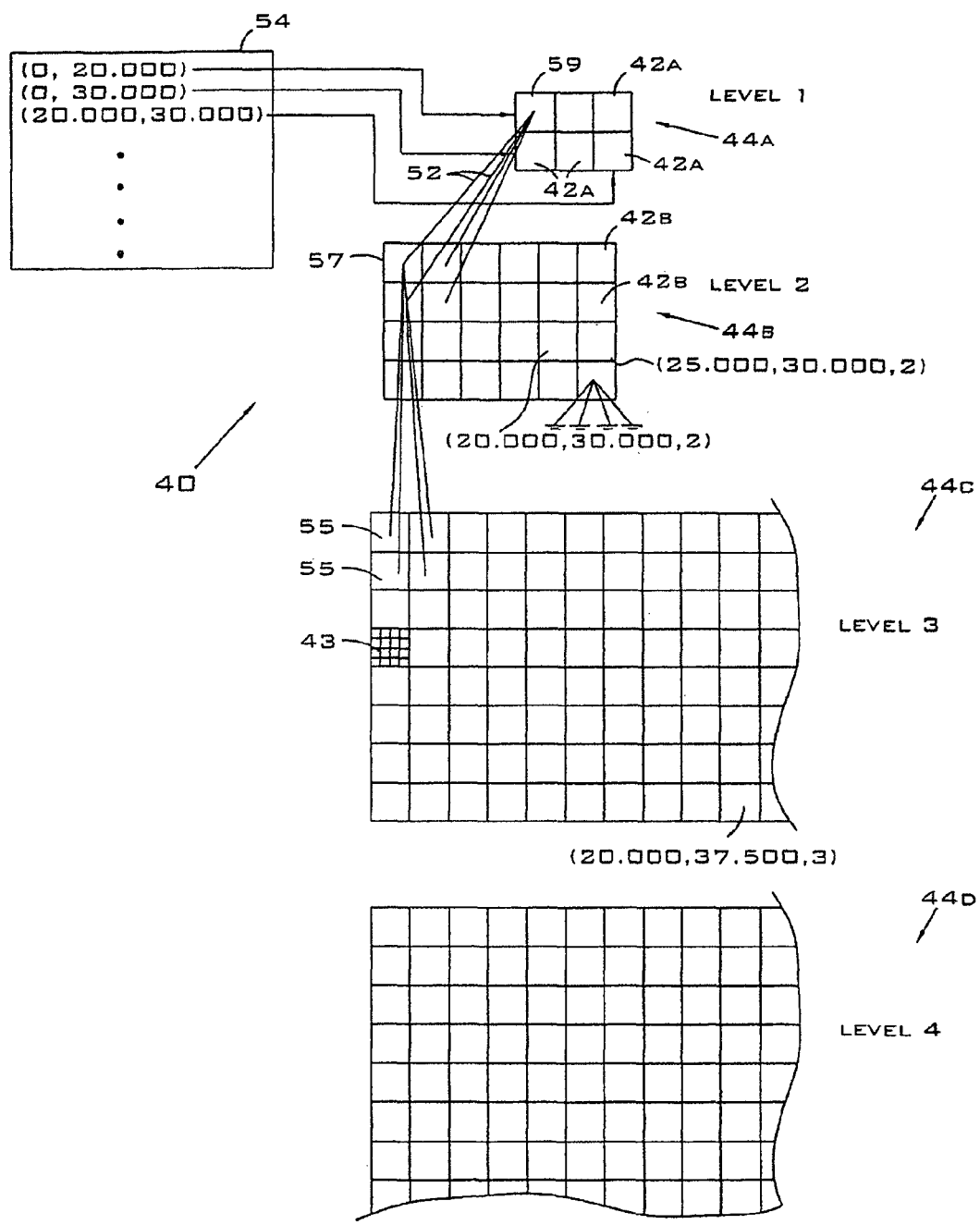
FIG. 2 is a schematic block diagram illustrating the data structure of images stored in a database on a pilot training server, in accordance with a preferred embodiment of the present invention.

FIG. 2 is a schematic illustration of the data structure of images stored in an image database 40 residing on, or in communication with the computer server 26, in accordance with a preferred embodiment of the present invention. Image database 40 comprises a plurality of image blocks 42, labeled 42A, 42B, etc., which contain data representing terrain in various areas as would be perceived from different heights. Preferably, substantially all of blocks 42 are of the same data size. Preferably, the size of the blocks is determined according to the expected rate of transmission of data via modem 24, so that a block 42 may be transmitted on the average within a predetermined amount of time, for example, half a second. In a preferred embodiment of the present invention, the blocks comprise 256×256 pixels, although the blocks may be of any other suitable size. Preferably, the blocks are divided into sub-blocks 43 of smaller sizes, such that processors which work with slow modems may download small sub-blocks in case the entire block is not required. In a preferred embodiment of the present invention, each block 42 is divided into sixteen sub-blocks 43 of 64×64 pixels. Each pixel is preferably represented by a color and an elevation attribute, as is known in the art. Blocks 42 are preferably real-life images of terrain areas received from airborne or satellite cameras.

Preferably, each sub-block 43 includes an attachment field in which additional optional data objects associated with the area covered by the sub-block are described. These objects preferably include, but are not limited to, labels, annotations, lines and 3D objects. Each object is preferably accompanied by coordinates which state the position of the object within sub-block 43. Preferably, the labels are stored in text format, the lines are stored as vectors, and the 3D objects are stored as polygons, although any suitable storage format may be used. The objects may be used to represent existing structures which are not viewed sufficiently well when shown as part of the image. Alternatively or additionally, the structures may be used to overlay virtual structures on the terrain. For example, it is possible to add planned buildings to the terrain and thus see the effect of the buildings on the view. Further alternatively or additionally, the objects may be used to overlay map symbols and other markings on the terrain. The markings are preferably overlaid on the view at a constant size regardless of the resolution level of the terrain displayed.

Blocks 42 are preferably stored in the image database 40 in a compressed form using any suitable compression method, such as JPEG. Blocks 42 are classified in successive resolution levels 44 labeled 44A, 44B, etc., according to the height from which they view the terrain and, therefore, the level of detail which they include. A plurality of blocks 42A which belong to the lowest resolution level 44A, labeled "level 1," cover the largest area per block and therefore have the least detail per area unit. It is noted that the size of the geographical area covered by blocks 42A of "level 1" is dependent on the specific application of the image database 40 and may be very diverse. For example, in some flight applications, a single block 42A includes an image of the entire Planet Earth, while in an atom-simulation application, which shows the terrain of an atom, block 42A shows the entire atom. Blocks 42B of the next level 44B, labeled "level 2," preferably cover a quarter of the area of blocks 42A of "level 1". Thus, for substantially each block 42A, there exist four blocks 42B which cover the same area. In a similar manner, each successive level 44 comprises blocks 42 which cover a quarter of the area of the blocks 42 of the lower resolution level.

Four blocks 55 of a certain level 44C, which cover the same area as a block 57 of the preceding level 44B, are referred to as descendants of block 57. Conversely, block 57 is referred to herein as the parent of blocks 55. The parent block 59 of block 57 is referred to herein as an "ancestor" of blocks 55, and is said to be of a lower resolution level than its descendants. It is noted that in FIG. 2, the lower resolution levels appear higher on the page.

Preferably, each block 42 in the image database 40 includes pointers 52 to the four descendants of the block. If one or more of the descendants does not exist, a null pointer 56 is preferably used. Preferably, a header record 54 comprises an index to blocks 42A of "level 1" such that the processor 20 can easily find the block 42A which covers a desired area.

The number of levels 44 is dependent on the images input to the computer server 26 and may differ for different areas of terrain. Thus, one block 42A may have descendants up to level 12, for example, while another block 42A may have no descendants. It is also noted that the number of descendants of each block 42 may have a value different from four, for example nine, and may differ for different levels 44.

Preferably, each block 42 is referenced using longitudinal and latitudinal (x,y) coordinates of one of the points in the block, such as the top right corner pixel, together with the resolution level 44 of the block.

Figure 3:
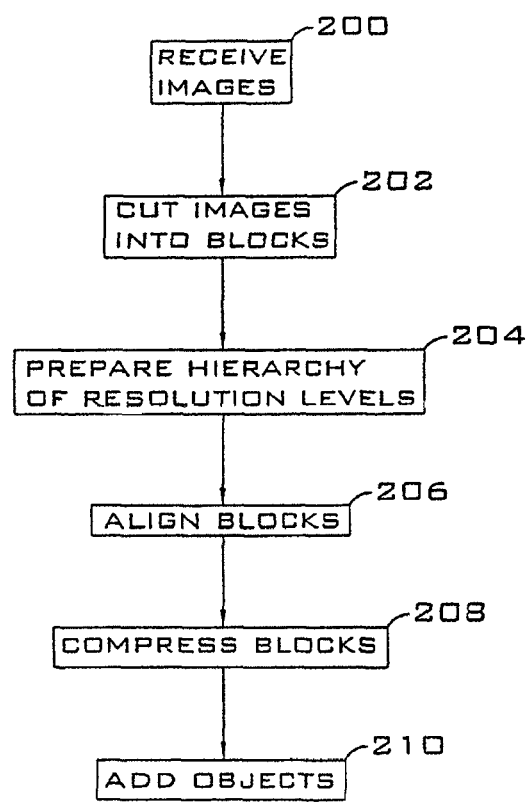
FIG. 3 is a flow chart illustrating a method for preparation of a pilot training database, in accordance with a preferred embodiment of the present invention.

FIG. 3 is a flow chart illustrating a method for preparation of the image database 40, in accordance with a preferred embodiment of the present invention. Preferably, all the steps described in FIG. 3 are performed automatically by a processor (referred to herein as a Terra builder). The Terra Builder may prepare the images online provided the images are supplied at a sufficient rate. Alternatively or additionally, the Terra Builder operates together with a human operator to achieve better accuracy in the preparation of the image database 40.

Preferably, the Terra builder receives one or more images of a terrain area covered by the database 40 (step 200). The images are preferably received in a standard format, such as TIFF or bitrnap. The images preferably cover adjacent areas or are partially overlapping. Some of the images may cover the same area at different levels of resolution.

The processor cuts the image up into blocks 42 and assigns these blocks temporarily to the highest resolution level (step 202). Blocks of lower levels of resolution are prepared by eliminating data from the original blocks (step 204). Preferably, the blocks of lower resolution levels are prepared by decimation, for example, by eliminating odd (or even) rows and columns from the higher level blocks. Further preferably, the blocks are filtered using a low pass filter, most preferably before the decimation.

Thereafter, the blocks from different images are aligned relative to each other, based on the coordinates of the images and the meter-per-pixel resolution values of the images (step 206). Preferably, the coordinates and meter-per-pixel values are received together with the images. Alternatively, an operator determines and inputs the coordinate correspondences and meter-per-pixel values by viewing the images. Further alternatively or additionally, the operator inputs the heights of the terrain for some or all of the pixels.

Blocks 42 are then compressed, for example, using the JPEG compression method (step 208). The operator may add labels, lines, virtual structures and other objects, before or after the compression (step 210). Alternatively or additionally, the processor automatically derives such objects from the images. For example, the processor may identify roads and/or runways in the images and represent them as objects so that they appear more clearly in substantially any resolution of display.

It is noted that although the hierarchical structure of the image database 40 requires extra storage space, relative to a non-hierarchical record of the terrain, the advantages of the hierarchical structure justify the extra storage space required. The use of the hierarchical structure allows faster rendering of the images on the visual display 22 and allows fast download of required images at low resolution levels. Optionally, in order to reduce storage requirements, some of blocks 42 are stored only in some of resolution levels 44, and when non-existent resolution levels are required, computer server 26 generates the required block from a descendant block of a higher resolution level.

Preferably, the user of the processor 20 on the client computer 310 is able to add virtual structures and/or other objects to the terrain described by database 40, while viewing the terrain. Preferably, a file stored locally on the processor 20 stores descriptions of the virtual structures added by the user of the processor 20.

Figure 4:
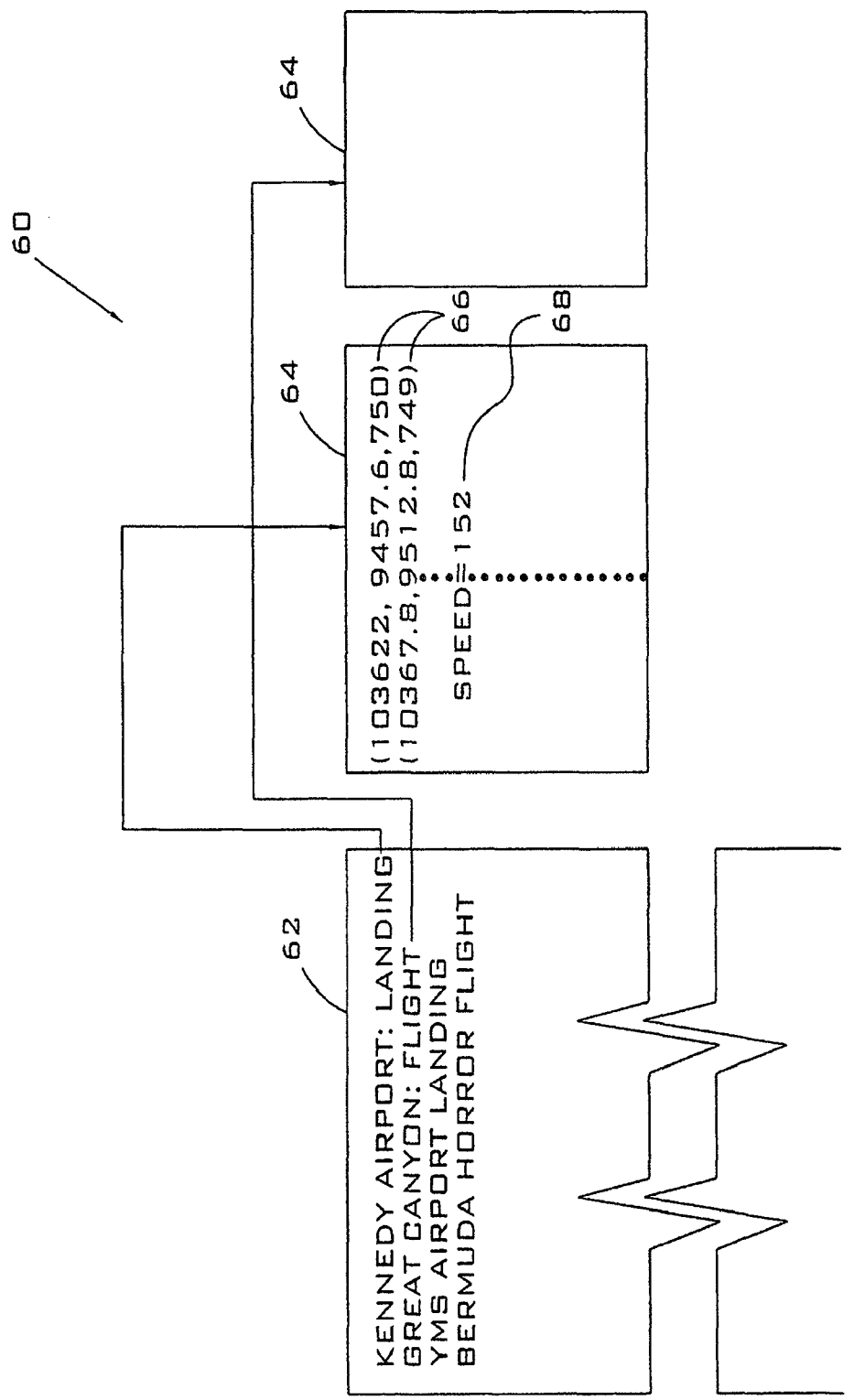
FIG. 4 is a schematic block diagram illustrating a flight course database on a pilot training server, in accordance with a preferred embodiment of the present invention.

FIGS. 4 is a schematic block diagram illustrating an example of a course stored on a course database 60 residing on or in communication with the computer server 26, in accordance with a preferred embodiment of the present invention. Preferably, the course database 60 includes a catalog file 62, which lists all the available routes stored in the course database 60. For each route, the course database 60 preferably includes a list 64 or three-coordinate points 66 which describe the route. The three coordinates preferably represent longitudinal, latitudinal, and height coordinates of the points along the course, as are known in the art of terrain mapping. Preferably, list 64 also includes speed settings 68, and/or other flight-relevant data The routes in the course database 60 preferably include routes terminating in landings at various airports. Using these routes, pilots may become familiar with airports to which they are scheduled to fly. Alternatively or additionally, the course database 60 includes routes of flight through difficult access areas, such as deep canyons in which helicopters need to fly. Further alternatively or additionally, the course database 60 may include routes for training military pilots in approaching a required target. Further alternatively or additionally, the course database 60 may include land routes through buildings, town, cities, and/or countries It is noted that other scenarios may be included in the course database 60, such as online images from an area of interest. For example, a route may be used to display a car race, and the points 66 describing the route may be received online using a GPS from one of the cars in the race. The cars are preferably superimposed on the images, using methods known in the art A user watching the race on a home computer may select any viewpoint of interest and is not limited to pre-chosen viewpoints selected by others. The user requested real-life three-dimensional images received by the client computer 310 arrive in the form of a stream of digital data. In order for the images to be viewable on the visual display 22, they must be reconstructed from the stream of digital data by the processor 20 on the client computer 310.

Figure 5:
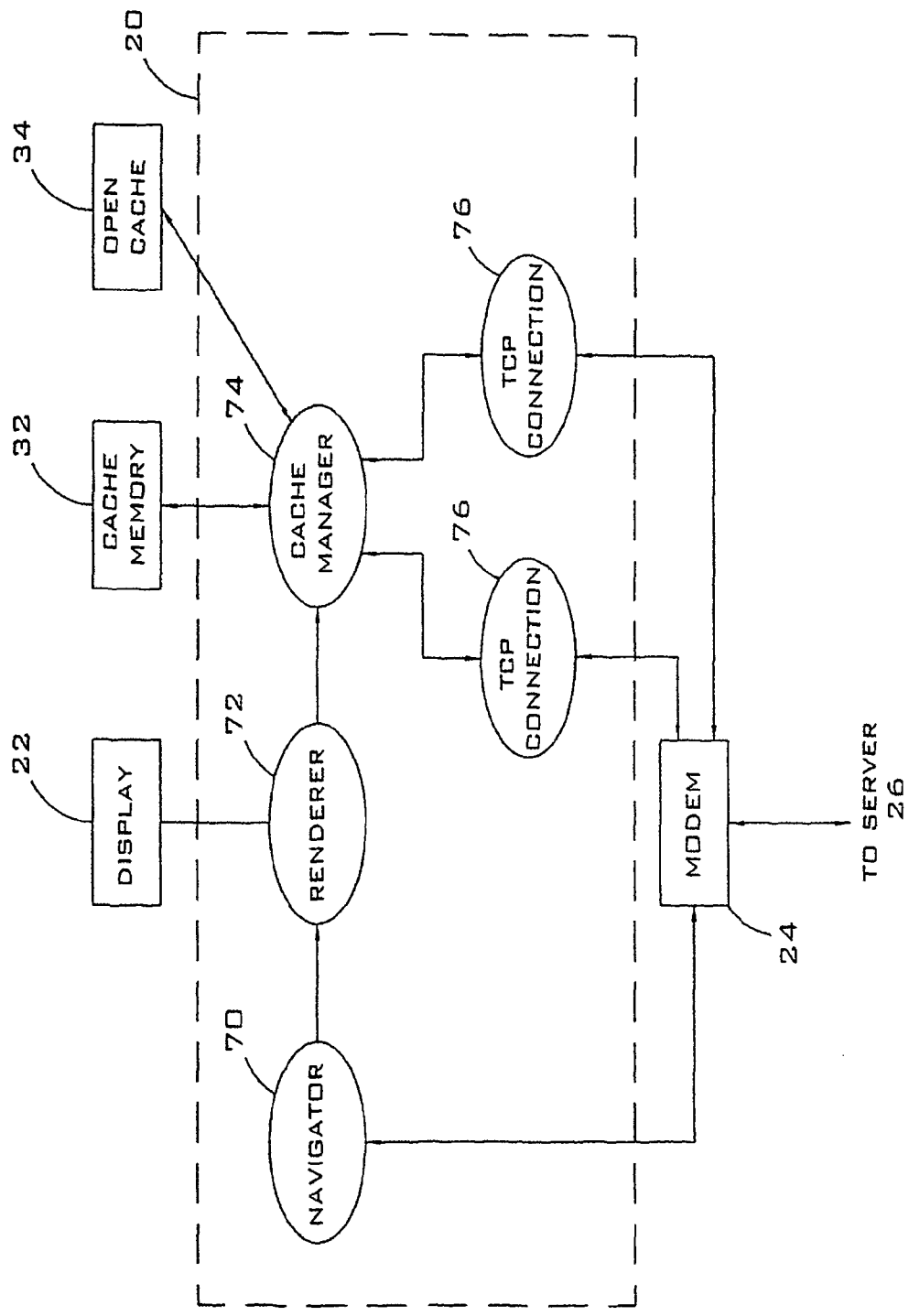
FIG. 5 is a schematic block diagram illustrating a processor for viewing three-dimensional real-life terrain images, in accordance with a preferred embodiment of the present invention.

FIG. 5 is a schematic block diagram of the processor 20 on the client computer 310, in accordance with a preferred embodiment of the present invention. The blocks are preferably realized as software processes running on a general-purpose microcomputer, although dedicated hardware realizations are also possible. Preferably, the processor 20 comprises a navigator 70, which keeps track of a viewpoint of a virtual viewer. The viewpoint preferably follows a predetermined course which a user of processor 20 is supposed to follow. Preferably, the course is received from course database 60.

Preferably, the navigator 70 sets a default view direction of the viewpoint in the direction of movement along the course. Alternatively, the default view direction is set directly down towards the terrain. The user may change the view direction of the viewpoint without moving out of the course. Therefore, there is no compulsory correlation between the flight direction and the view direction. Preferably, the user may change the speed of motion along the course. Further preferably, the user may move the viewpoint out of the course in order to view the area around the predetermined course, onto try to find a better course. Preferably, the user controls the direction, speed, altitude and/or any other parameter of the viewpoint. Specifically, the user may freeze the viewpoint in order to have a better look at the view from a certain point or angle.

The processor 20 preferably further comprises a renderer 72, which calculates the view from the viewpoint and continuously renders the view on the visual display 22. The renderer 72 determines the coordinates of the pixels it needs in order to render the view and requests the descriptions of these pixels from a cache manager 74. Preferably, the renderer 72 determines which blocks 42 and/or sub-blocks 43 include the required pixels. Alternatively, the cache manager 74 determines the identity of the required blocks 42 and/or sub-blocks 43. Along with each required pixel, block 42, or sub-block 43, renderer 72 preferably states the resolution level 44 at which the block is required. The resolution level is preferably determined based on the distance between the viewpoint and the desired pixel or block 42. Further preferably, the resolution level is also dependent on the number of pixels in the image displayed on the visual display 22. Preferably, the resolution levels are chosen so that an approximate 1:1 ratio is achieved between the number of displayed pixels and the number of data pixels. Preferably, the renderer 72 also overlays the objects associated with the rendered sub-blocks 43.

Preferably, cache manager 74 manages a group of blocks 42 and/or sub-blocks 43 in a cache memory 32 of the processor 20, for example in the main memory of the processor 20, in accordance with a method described hereinbelow. Alternatively or additionally, the cache memory 32 is defined in a local hard disk associated with the processor 20. Thus, even if the processor 20 is shut down, the renderer can immediately resume operation when the processor 20 is turned on again, at the point it left off, without downloading the data again from the computer server 26. Further alternatively or additionally, the processor 20 determines areas which are most commonly visited by the user of the. processor 20, and blocks 42 from these areas are permanently stored in the local hard disk of the client computer 310. One such preferred application involves positioning the processor 20 within a ground vehicle in order to view the surroundings of the vehicle. Since the vehicle is usually located in the same area, the required download time may be reduced substantially.

It is noted that the term cache memory is used herein generally to refer to any relatively small memory which can be accessed rapidly by the processor 20 and is used to save data which is most likely to be used by the processor 20.

The cache manager 74 downloads from the computer server 26 the blocks 42 and/or sub-blocks 43 required by renderer 72, if they are not already stored in cache memory 32, and meanwhile provides replacement blocks from the cache memory. Preferably, the cache manager 74 references blocks 42 on the computer server 26 by providing pointers to the required blocks. The cache manager 74 has the pointers for the lowest resolution level blocks 42A from header record 54. The pointer to a desired block 42 of any other level 44 is preferably taken from the parent block of the desired block, as described above. Therefore, as described hereinbelow, the cache manager 74 preferably always requests that the computer server 26 send a block 42 after the cache manager has received its parent block.

As previously stated, after the end user requests a real-life three-dimensional image from an e-commerce business 304 via the client computer 310, the request is redirected by the e-commerce business 304 to the computer server 26. Preferably, the processor 20 on the client computer 310 establishes one or more communication connections 76 with the computer server 26 through which blocks 42 are sent to the processor 20. Connections 76 are preferably standard TCP connections as are known in the art, although any other protocol may be used to form the connection. Preferably,. when connections 76 are not in use bringing blocks 42 required by the renderer 72, the cache manager 74 downloads blocks in the area of the viewpoint to fill cache memory 32. Preferably, the cache manager 74 attempts to fill cache memory 32 with a sufficient number of blocks, such that for any view direction of the current viewpoint, all blocks 42 required by the renderer 72 are stored in cache memory 32. Preferably, the cache manager 74 stores in cache memory 32 the same number of blocks 42 in each resolution level 44. Preferably, cache memory 32 stores, for each resolution level 44, between 9 and 36 blocks, which are most preferably organized in a square centered directly below the location of the viewpoint. In a preferred embodiment of the present invention, cache memory 32 stores sixteen blocks 42 organized in a square for each resolution level 44. Blocks 42 are preferably chosen such that the viewpoint is closest to the center of the square, most preferably, as described in the above-mentioned U.S. patent application Ser. No. 08/939,948.

Preferably, blocks 42 are stored in cache memory 32 in the compressed form in which they are received from the computer server 26. Further preferably, the cache manager 74 decompresses the blocks before they are provided to the renderer 72. Preferably, the cache manager 74 manages, in addition to cache memory 32, an open cache memory 34 in which blocks 42 and/or sub-blocks 43 which were decompressed are stored. Preferably, open cache memory 34 is of a size determined according to the amount of available empty storage space on the memory associated with the processor 20 and/or the size of the image rendered on the visual display 22. Preferably, the user of the processor 20 may adjust the size of open cache memory 34 in order to achieve maximal rendering speed by saving the time required for decompression. In a preferred embodiment of the present invention, open cache memory 34 has a default size sufficient to store a few hundred decompressed sub-blocks 43.

Preferably, when open cache memory 34 is full, a least recently used (LRU) method is used to determine which sub-block 43 is to be discarded to make room for a new sub-block. A preferred LRU method is described in the above-mentioned Ser. No. 08/939,948 patent application. Alternatively or additionally, any other suitable method of memory management may be used to manage cache memory 32 and/or open cache memory 34.

The renderer 72 uses blocks 42 from cache manager 74 to render the required view on display 22. Preferably, when the cache manager 74 provides a block 42 of a lower resolution level than that requested by the renderer 72, the renderer 72 uses the provided block to interpolate a higher resolution-level block. Preferably, the higher resolution-level block is s interpolated using any method known in the art, such as bilinear, fractal, or texture blending.

When the cache manager 74 finishes downloading an additional block of a higher resolution level from the computer server 26, the block is provided to the renderer 72, which updates the rendered view accordingly. Preferably, when the viewpoint is in motion, the renderer 72 updates the view at least ten times per second so that the user has a perception of constant movement, although other rates of update may also be used. Preferably, the renderer 72 renders the view each time from scratch without using previously-rendered views.

Preferably, the renderer 72 is as described in the above mentioned U.S. patent application Ser. No. 08/939,948. Alternatively or additionally, the renderer 72 may operate in accordance with any other method known in the art. The renderer 72 is preferably implemented entirely in software. Alternatively, the renderer 72 includes a dedicated hardware processor, such as a 3D graphic accelerator, along with a software package running on general purpose processor 20 which provides blocks 42 to the dedicated hardware processor.

Figure 6:
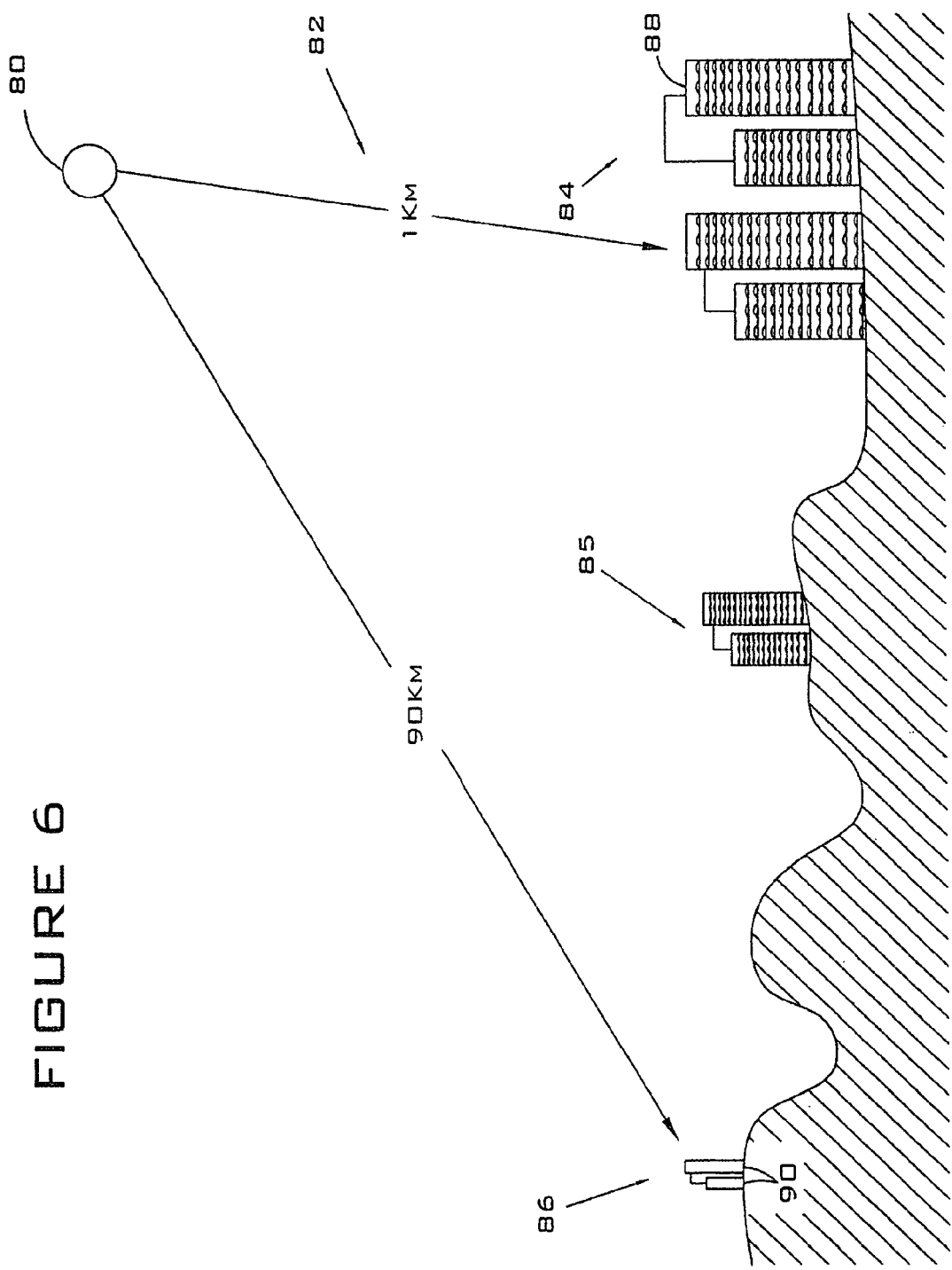
FIG. 6 is a schematic view of a viewpoint and a scene viewed therefrom, useful in understanding a method of displaying the selected route, in accordance with a preferred embodiment of the present invention.

FIG. 6 is a schematic view of a viewpoint 80 and a scene 82 viewed therefrom, used to explain the operation of the renderer 72, in accordance with a preferred embodiment of the present invention. Scene 82 includes areas 84 close to viewpoint 80, for example 1 kilometer from the viewpoint. Other areas 86 of scene 82 are far away from viewpoint 80, for example, 50-100 kilometers away. Still other areas 85 of scene 82 may be at other distances from viewpoint 80. In order to build a real life image of the view from viewpoint 80, the renderer 72 needs blocks 42 from a high resolution level 44 of area 84, such that a group of buildings 88 in area 84 are seen in the image as they would be seen from 1 kilometer away. However, for area 86, the renderer 72 needs only a low resolution level block 42 since a group of buildings 90 in area 86 would not be seen from viewpoint 80.

Preferably, the renderer 72 determines the exact blocks needed and calls for them using their (x,y) coordinates and their resolution level 44. Alternatively or additionally, the renderer 72 specifies, for each resolution level 44, the coordinates of the boundaries of the necessary areas, and the cache manager 74 determines the identities of the required blocks 42. Preferably, when only a small part of a block 42 is required, the cache manager 74 orders only the required sub-blocks 43 in order to save transmission time. On the average, rendering a view image requires between about 20 and 200 sub-blocks 43 of various resolution levels 44.

Figure 7:
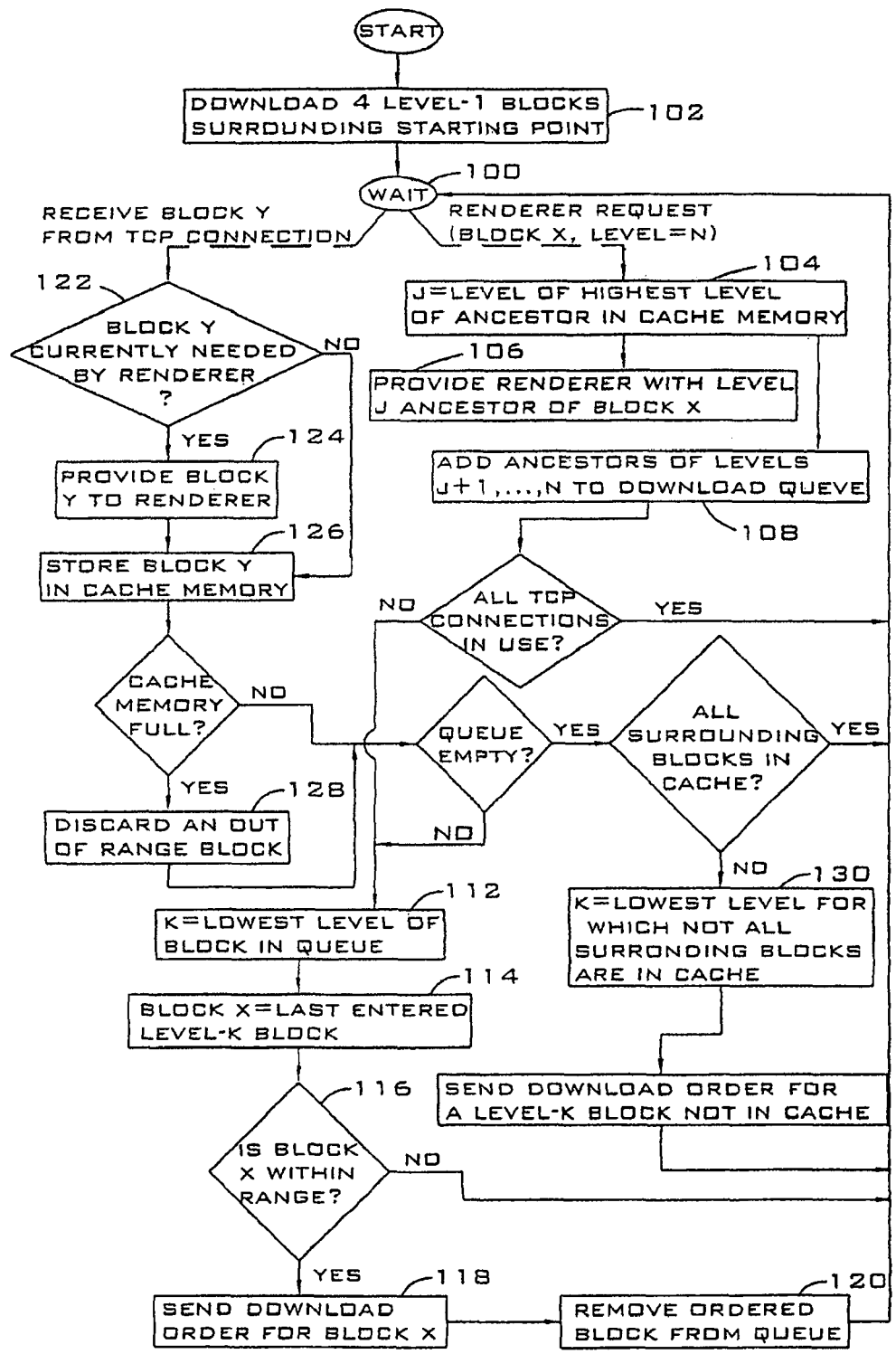
FIG. 7 is a flow chart illustrating the actions of a cache manager while the processor of FIG. 4 displays a selected route, in accordance with a preferred embodiment of the present invention.

FIG. 7 is a flow chart illustrating the actions of the cache manager 74 in displaying a selected route by the processor 20, in accordance with a preferred embodiment of the present invention. After downloading the first batch of level 1 blocks, as indicated in block 102, the cache manager 74 moves into a wait state, as indicated by block 100.

Figure 8:
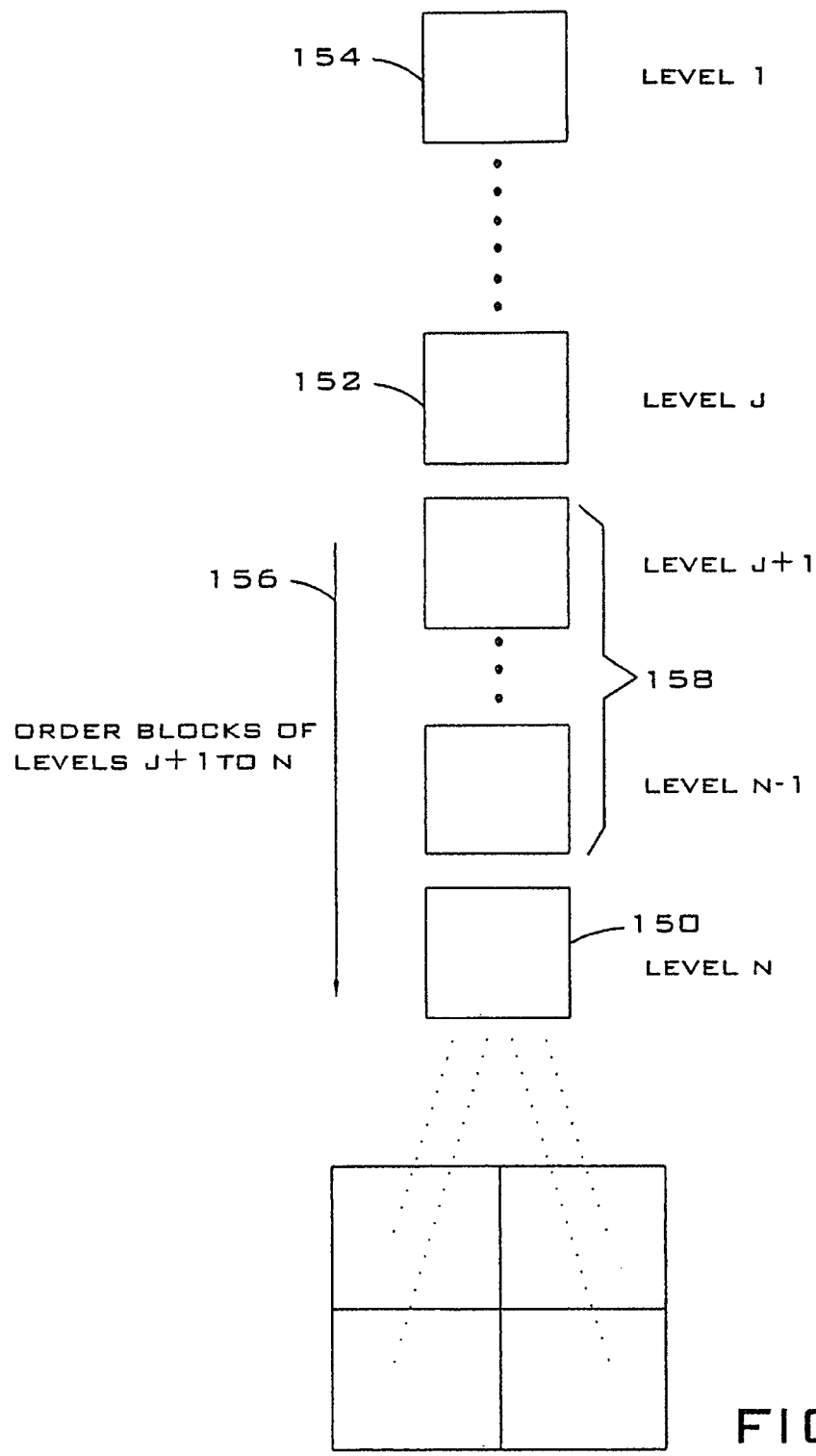
FIG. 8 is a schematic illustration of an image block from the data structure of FIG. 2, along with its ancestors, useful in understanding the flow chart of FIG. 8.

Reference is also made to FIG. 8, which is a schematic illustration of a block 150 (corresponding either to one of blocks 42 or one of sub-blocks 43) requested by the renderer 72, and ancestors 152, 154 and 158 of the requested block. When a request for block 150, identified as "x," and having resolution level N, is received from the renderer 72, the cache manager 74 determines, as indicated in block 104 (FIG. 7), the level j of the highest resolution-level ancestor of block x stored in cache memory 32. If the block 42 itself is stored in cache memory 32 (i.e., j=N), the block is provided to renderer 72. Otherwise, the highest resolution level ancestor 152 of block x which is stored in cache memory 32 is provided to the renderer 72, as indicated in block 106. As described hereinbelow, the cache manager 74 downloads the rest of the ancestors 158 of block x from the computer server 26 in order of increasing resolution levels, as indicated by an arrow 156 in FIG. 8. As the blocks are received from the computer server 26, they are supplied to the renderer 72 so that the user sees an image whose resolution increases with time.

Thus, if viewpoint 80 is not changed, or is changed relatively slowly, the resolution level of the images displayed by the renderer 72 is slowly increased until the maximal desired resolution is reached. Naturally, if the image database 40 does not include blocks at a desired level of resolution for a certain area, the last block supplied is of the highest existing level of resolution for that certain area.

If no ancestor of block x is found in memory 32 (an eventuality not shown in the figure), the level 1 ancestor 154 of the block is ordered from the computer server 26, based on the pointer to the level 1 ancestor block in header record 54. While waiting for the ordered block, renderer 72 preferably renders a blank block to the display. Alternatively, renderer 72 waits until level 1 ancestor 154 is received. However, it is noted that such cases are very rare, since blocks 42A of level I cover very large areas, and usually, blocks 42A adjacent to the block in use are also downloaded and stored in cache memory 32.

If block x itself was not found in memory 32, the cache manager 74 adds to a download queue the block x and all its ancestors 158 of resolution levels higher than level j, as indicated by block 108. If all TCP connections 76 available to processor 20 are in use, the cache manager 74 returns to wait state 100 until one of connections 76 is available. If one of connections 76 is available the newly added blocks to the queue are immediately ordered. Preferably, the cache manager 74 proceeds to send a download order to the computer server 26 for the lowest resolution-level block in the download queue, as indicated by blocks 112, 114, 116 and 118. Alternatively or additionally, the download queue is managed by the computer server 26.

Preferably, if more than one block of the lowest resolution level is in the queue, the last entered block is downloaded (so long as the block is still within range, as described hereinbelow). The downloaded block is thereafter removed from the queue, either when the download order is sent as indicated in block 120, or when the block has been completely received. The cache manager 74 preferably moves back to wait state 100 to wait for the completion of the downloading of the block.

Preferably, before a download order for block x is sent to the computer server 26, the cache manager 74 checks whether the block is still needed, as indicated by block 116. Most preferably, the cache manager 74 checks whether the block is within a range of the current viewpoint such that it would meet the criteria for the cache manager 74 to order it for download to cache memory 32. If block x is not within the range of the current viewpoint, the block is not useful for the renderer 72 and is therefore not downloaded. This situation may occur when the viewpoint has changed substantially since block x was put into the download queue. Alternatively or additionally, the cache manager 74 scans the download queue periodically for block orders which are not currently useful and must be erased from the queue.

When one of TCP connections 76 notifies the cache manager 74 that the transfer of a block Y has been completed, the cache manager 74 checks whether the block is currently needed by the renderer 72, as indicated by block 122. Preferably, the cache manager 74 queries the renderer 72 regarding each received block as to whether the renderer 72 currently needs the block. Alternatively or additionally, the cache manager 74 maintains a list of blocks for which download orders were sent, and therefore are needed by the renderer 72. Preferably, the renderer 72 notifies the cache manager 74 of blocks it requested and did not receive and which it does not need any more. Alternatively, each order from the renderer 72 to the cache manager 74 includes all the blocks it needs, and any blocks not in the order are not needed.

If renderer 72 needs the downloaded block (i.e., it was not ordered solely to fill cache memory 32, as described hereinbelow), it is passed to the renderer 72, as indicated by block 124.

Preferably, all the received blocks are stored in cache memory 32 for later use, as indicated by block 126. If cache memory 32 is full, a block beyond the predetermined range from the current viewpoint is discarded, as indicated by block 128. Preferably, the discarded block is the least recently used block which is beyond the predetermined range. Alternatively, the discarded block is chosen from the highest resolution level for which there are blocks beyond the predetermined range.

After downloading of a block has been completed, one of connections 76 is necessarily not in use. If the download queue is not empty, a block from the queue is downloaded as described hereinabove and indicated in blocks 112, 114, 116 and 118. However, if the queue is empty, the cache manager 74 fills cache memory 32 with the blocks within the range of the current viewpoint, so that, for any direction of view from the current viewpoint, there is no need to download further blocks from the computer server 26.

Preferably, the next block downloaded for filling cache memory 32 is from the lowest resolution level for which all the blocks in the range of the viewpoint are not already in the cache memory, as indicated in block 130. Further preferably, the cache manager 74 first downloads the eight blocks surrounding the block which is directly below the current viewpoint. Alternatively or additionally, the blocks are ordered according to the current view direction of the viewpoint.

Figure 9A:
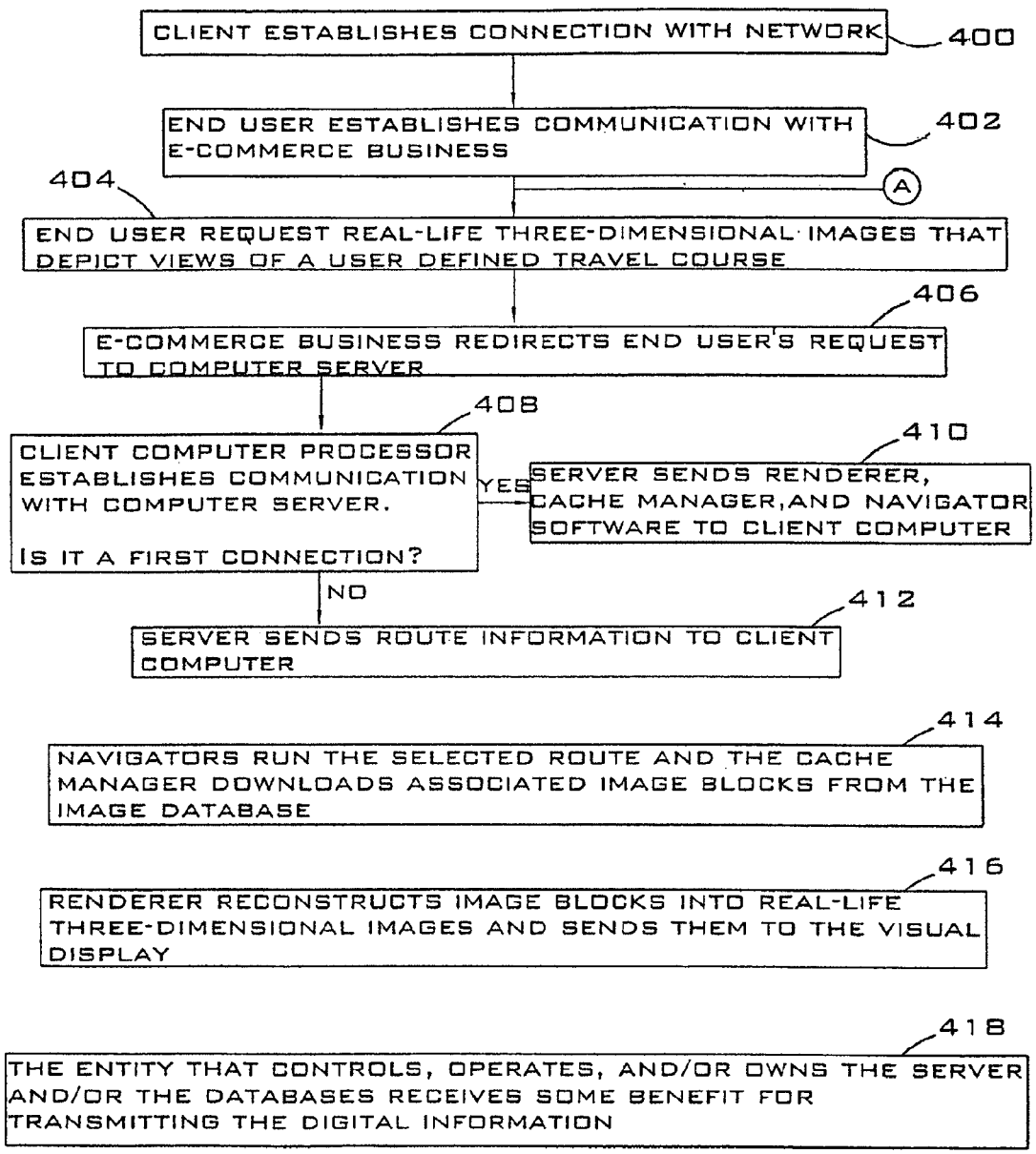

FIGS. 9a and 9b are flow diagrams illustrating a method for obtaining a benefit for sending information over a communication network, in accordance with an embodiment of the invention. Referring to FIGS. 9a and 9b, the end user first uses the client computer 310 containing the processor 20 to connect to the communication network 306 via the communication network interface 24 (step 400). After this connection is established, the end user establishes communication with an e-commerce business 304 that is also in communication with the communication network 306 (step 402). The connection with the e-commerce business 304 can be established through the use of a communication network browser program that is executed by the processor 20 on the client computer 310. Examples of satisfactory communication network browser programs include, but are not limited to, Netscape Navigator and Internet Explorer.

After the connection with an e-commerce business 304 is established, the end user either makes a request for real-life three-dimensional images that depict views of a user defined virtual travel course (step 404) or the user makes a request for real-life three-dimensional images that depict views of a preset guided tour (step 420). If the end user's request is for the real-life three-dimensional images that depict views of a user defined travel course, the request is redirected by the e-commerce business 304 to the computer server 26 (step 406). When the e-commerce business 304 redirects the user's request, it sends digital information representing the user defined travel course and overlay data to the computer server 26. The overlay data can include, but is not limited to, digital information representing things such as labels, three-dimensional objects, and billboards. This overlay data can be inserted into the views along the user defined travel course. The user defined travel course information and the overlay data, once received by the computer server 26, are converted by the computer server 26 into a format that is compatible with the navigator 70 running on the client computer 310.

Upon redirection, the processor 20 on the client computer 310 established communication with the computer server 26 (step 408). Preferably, if the processor 20 is accessing the computer server 26 for the first time, the computer server 26 sends the processor 20 a software package which includes the navigator 70, the renderer 72 and the cache manager 74 (step 410). The software package can be in the form of an ActiveX plug-in sent to the communication network browser running on the processor 20. Alternatively or additionally, the user of the processor 20 May receive the software package on a compact disk (CD) or on any other storage media. Preferably, the software package is stored on the client computer 310 so that the package need be sent only once.

Thereafter, the computer server 26 sends the user defined virtual travel course information and overlay data to the navigator 70, preferably using one or more of TCP connections 76 (step 412).

Alternatively, if the end user's request is for a preset virtual guided tour from the e-commerce business 304 (step 420), the e-commerce business determines if the proper software (navigator 70, renderer 72 and cache manager 74) is running on the processor 20 (step 422). If this software is not present on processor 20 the e-commerce business 304 redirects the client computer 310 to the server 26 to download the software (step 424). If the software is already present on processor 20 or after the software is downloaded to processor 20, the e-commerce business sends the properly formatted preset virtual guided tour course information and overlay data directly to the client computer 310 (step 426). In a preset virtual guided tour, the user has the option of following the downloaded preset tour course or navigating freely along any alternate user defined travel course.

After the user defined travel course information or the virtual guided tour information is received by the processor 20, the navigator 70 begins to run on the downloaded course. Concurrently, the cache manager 74 is ordered to download one or more, preferably four, level 1 blocks 42A surrounding the starting point of the route from the image database 40 that is in communication with the computer server 26 (step 414). Thus, the cache manager 74 will have in local cache memory 32 images of a very large area surrounding the starting point. The cache manager 74 can therefore provide to the renderer 72 images which cover substantially any area, even if only at a low resolution level initially. The renderer 72 then reconstructs the images and sends them to the visual display 22 (step 416). Alternatively or additionally, the user may choose to begin a tour at a specific location, without referring to a specific route.

The user is able to decide whether to display some or all of the objects associated with the database. Thus, the user may request to view only the images without any of the objects, or to see only objects which represent existing structures. The user is able to request to view the images with or without labels. Thus, on a first visit to a new area, the user may view the area with labels which allow easy acquaintance with the area, while at a second visit, the user may omit the labels in order to test whether he/she has properly memorized the important labeled landmarks. Preferably, the user is able to switch between viewing the terrain with and without the objects, so that, for example, the user may easily compare the view of a desired area with and without a group of planned structures.

In response to the computer server 26 transmitting the digital information representing real-life three-dimensional images to an end user, the entity that controls, operates, and/or owns the server 26 and/or the data in the databases 40, 60 receives some benefit (step 418). The benefit can include, but is not limited to, monetary compensation and/or increased recognition of the entity by the public or some group ('including increased "traffic" or "hits" to the entity's web site). The monetary compensation can be provided to the entity by the e-commerce business 304 or by some other company such as an advertiser associated with the entity, in that the entity includes the advertiser's advertisements within the images sent by the entity to the end user. Alternatively, an end user can connect to the computer server 26 to request real-life three-dimensional image depicting views of preset virtual guided tours. The end user uses the client computer 310 to establish a connection with the computer server 26. The computer server 26 sends the catalog 62 and/or the header record 54 to the processor 20. The end user of the processor 20 chooses a desired route from the catalog 62, and the navigator 70 downloads the route from the course database 60 that is in communication with the computer server 26. The navigator 70 then begins to run on the downloaded course as describe hereinabove.

It will be appreciated that the above-described embodiments relate to displaying three dimensional real-life images. A variety of embodiments and uses are within the scope of the invention including, but are not limited to, displaying of terrain for purposes of real estate trading, travel, education and amusement uses, in which the terrain may be shown at various levels of detail. Furthermore, the terrain is not limited to the Earth or parts thereof, and may cover other planets (real or virtual) and/or 3D views of surfaces of real or imaginary objects, such as views showing the atomic structure of a material, and the like. In addition, the data streaming methods of the present invention may be used to convey large databases of data which are to be displayed graphically, such as in graphic displays of stock values. It also will be appreciated that the embodiments described above are cited by way of example, and the full scope of the invention is limited only by the claims.

The invention claimed is:

1. A method of retrieving over a network a three-dimensional representation of a three-dimensional surface, wherein three-dimensional features of said surface are represented by data arranged in a hierarchical structure including portions of said surface at a plurality of detail levels comprising:
  retrieving locally stored data corresponding to a three-dimensional representation of a portion of said surface at a certain detail level from a local memory;
  determining whether said portion of said surface is at a detail level that satisfies a calculated detail level, and
  dynamically requesting over a network remotely stored additional three-dimensional data of portions of said surface until the calculated detail level is satisfied.

2. The method of claim 1 wherein the three-dimensional representation is received at a particular computer in a network of computers.

3. The method of claim 1 wherein the retrieving is from a remote server.

4. The method of claim 1 wherein the calculated detail level is based on a particular viewpoint.

5. The method of claim 1 wherein the additional data is compressed.

6. The method of claim 1 further comprising downloading and caching excess information not currently needed.

7. The method of claim 1 wherein said requesting includes providing one or more coordinates along with detail level information.

8. The method of claim 1 wherein at least some of said information contains color attributes.

9. A system for sending information over a network representing at least a portion of a three-dimensional surface comprising:
  a local computer and a remote computer communicating via a network;
  the local computer having storage capability to store sets of information representing physical features of a portion of the three-dimensional surface;
  the remote computer having storage capability to store hierarchical sets of information representing physical features of the portion of the three-dimensional surface at increasing resolution levels;
  said local computer adapted to dynamically request sets of information representing three-dimensional features of said portion of the three-dimensional surface from said remote computer of higher and higher resolution until resolution at said local computer satisfies a predetermined level.

10. The system of claim 9 further comprising a cache memory and cache manager.

11. The system of claim 9 wherein said hierarchically stored sets of information are compressed.

12. The system of claim 9 wherein at least some of said sets of information contain elevation attributes.

13. The system of claim 9 wherein at least some of said sets of information contain color attributes.

14. A method of retrieving over a network a three-dimensional representation of a geospatial area, wherein the three-dimensional features of said area are represented by blocks of data corresponding to portions of the area arranged in a hierarchical structure at a plurality of resolution levels comprising:
  retrieving a locally stored block of data corresponding to a portion of the three-dimensional area from a local memory;
  determining whether said block of the three-dimensional area is at a detail level that satisfies a calculated detail level, and
  dynamically requesting over a network remotely stored additional blocks of three-dimensional data corresponding to said portion of the three-dimensional area at a higher detail level until the calculated detail level is satisfied.

15. The method of claim 14 wherein the three-dimensional representation is received at a particular computer in a network of computers.

16. The method of claim 14 wherein the requesting is to a remote server.

17. The method of claim 14 wherein the calculated detail level is based on a particular viewpoint.

18. The method of claim 14 wherein the additional blocks are compressed.

19. The method of claim 14 further comprising downloading and caching excess blocks not currently needed.

20. A method for sending information representing at least a portion of a three-dimensional surface over a network between a local computer and a remote computer, where
  the local computer has storage capability to store sets of information representing physical features of a portion of the three-dimensional surface, and the remote computer has storage capability to store hierarchical sets of information representing physical features of the portion of the three-dimensional surface at increasing resolution levels;
  the method comprising:
    dynamically requesting at said local computer, sets of information representing three-dimensional features of said portion of the three-dimensional surface from said remote computer of higher and higher resolution until resolution at said local computer satisfies a predetermined level.

* * * * *